Jan. 17, 1961   L. L. A. THOMPSON ET AL   2,968,194
REMOTE CONTROL FOR MULTIPLE SPEED TRANSMISSION
Filed May 22, 1957   4 Sheets-Sheet 1
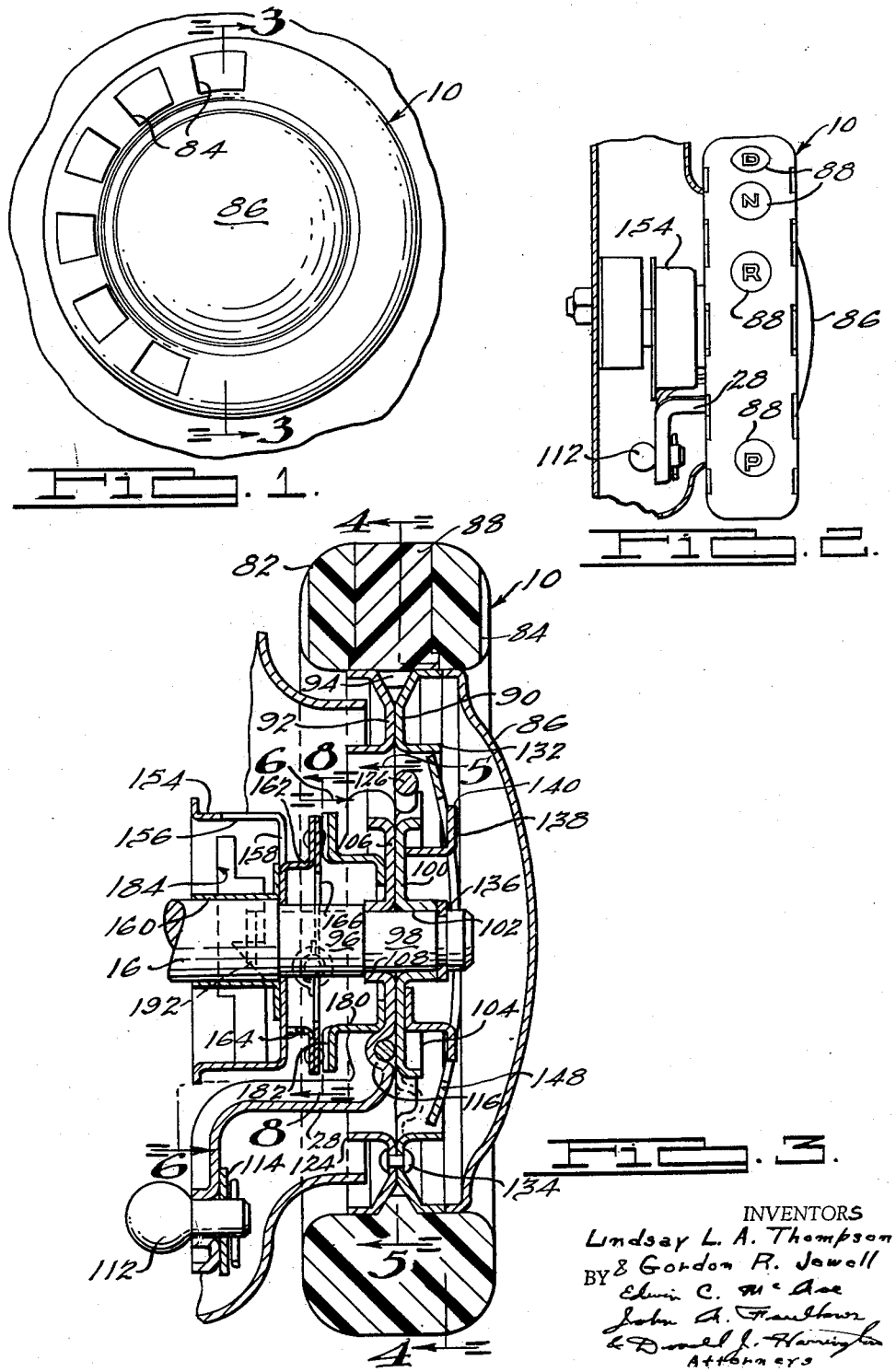
INVENTORS
Lindsay L. A. Thompson
Gordon R. Jewell
Edwin C. McAee
John A. Faulkner
Donald J. Harrington
BY
Attorneys

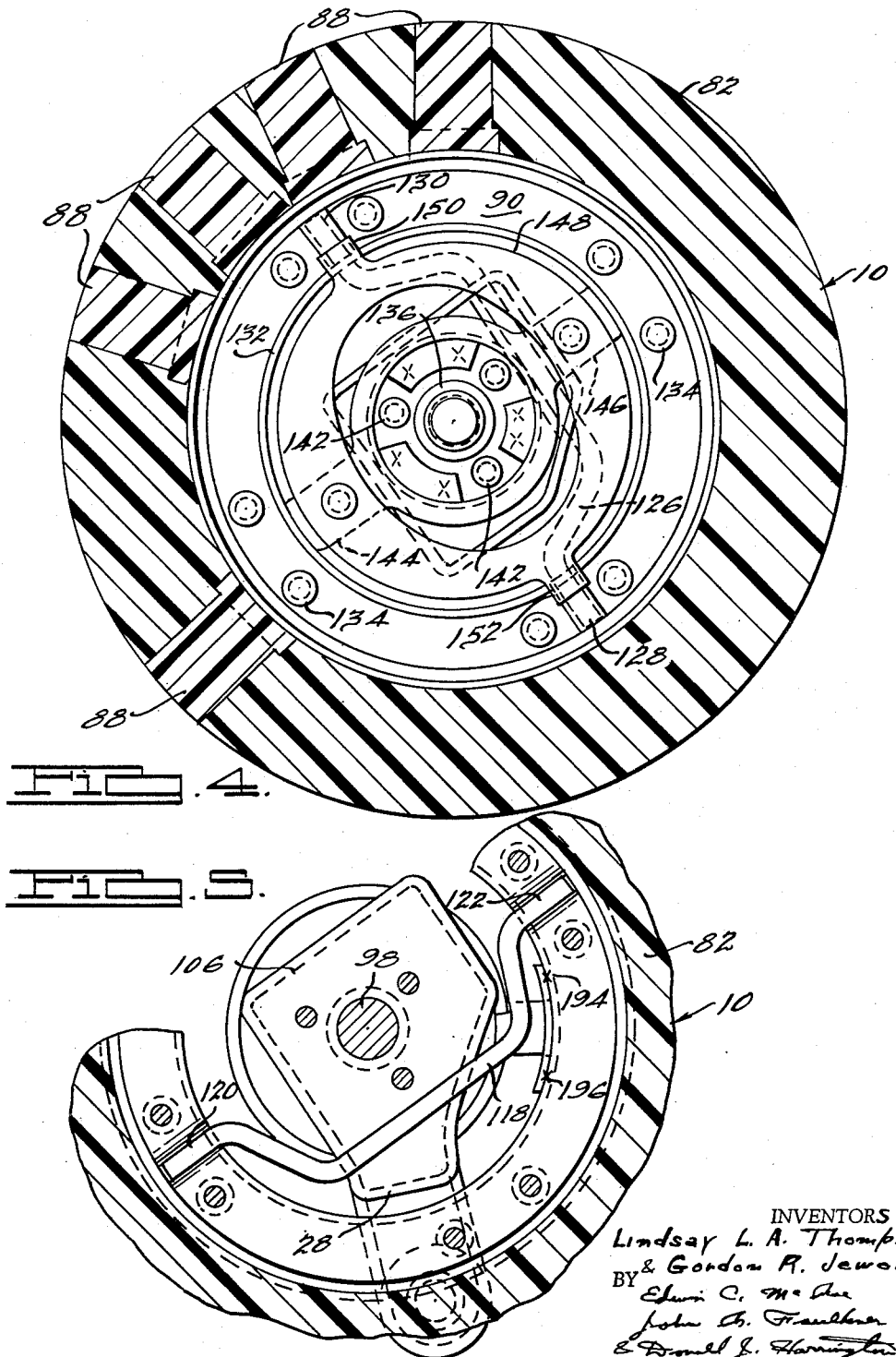

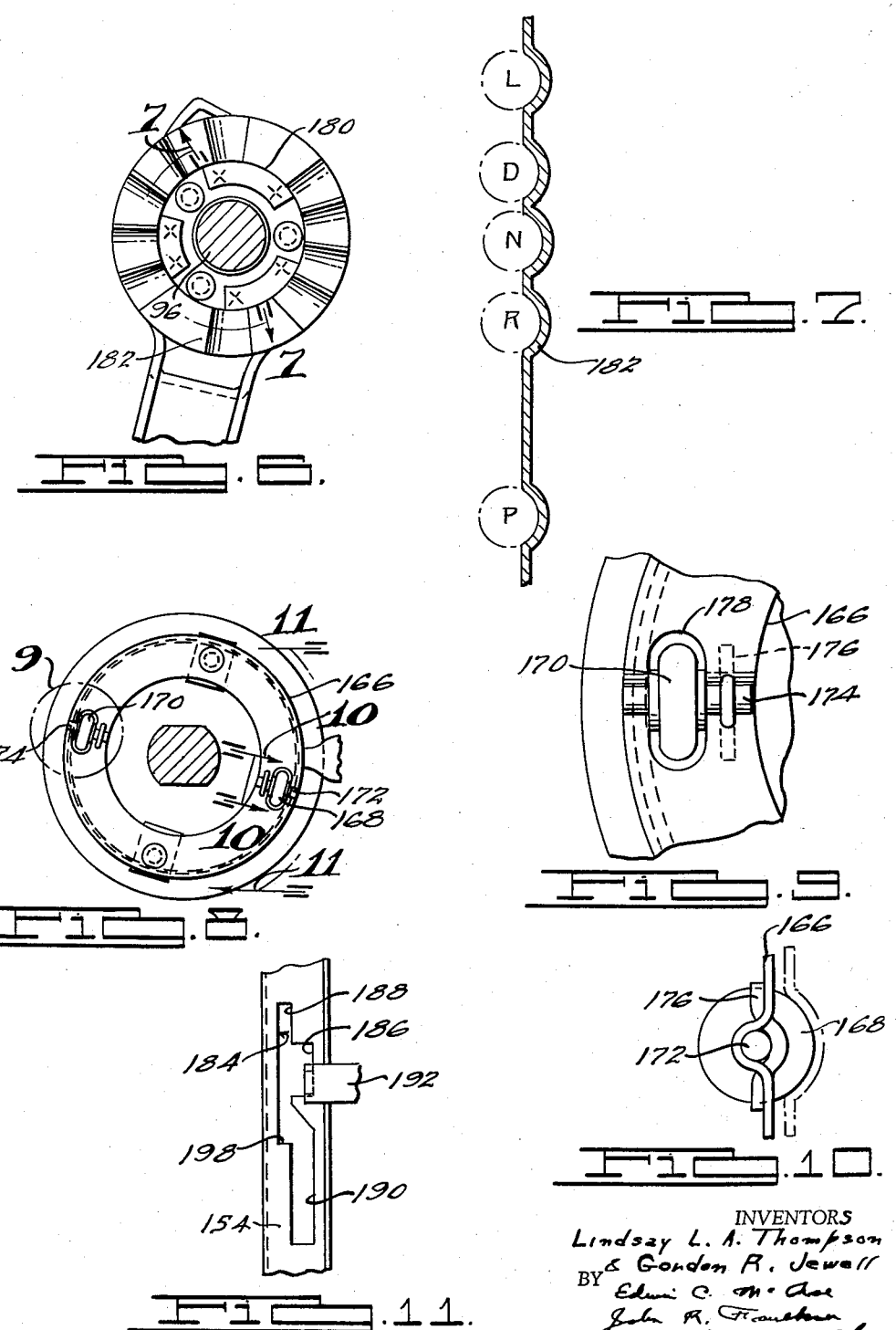

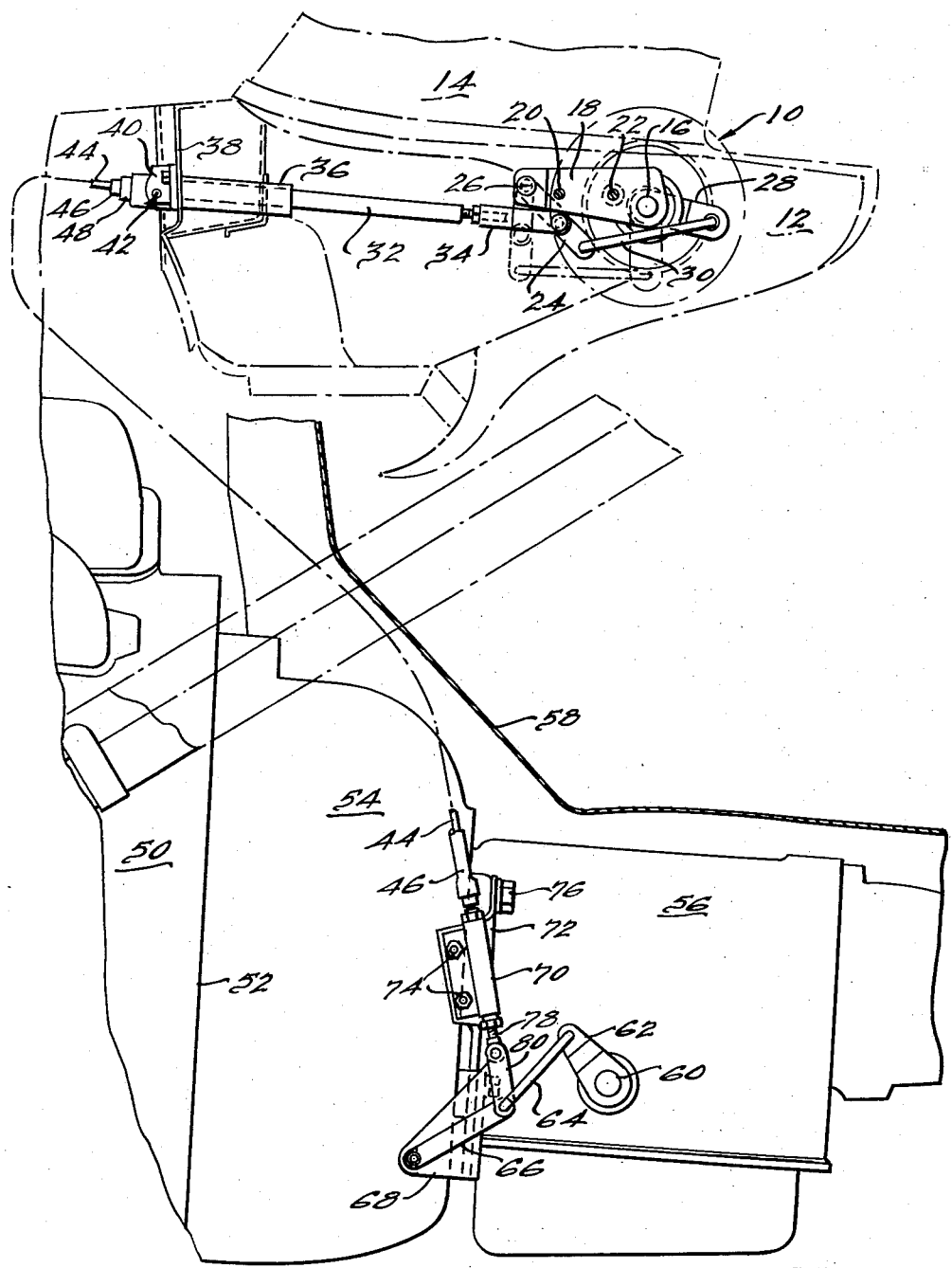

United States Patent Office 2,968,194
Patented Jan. 17, 1961

2,968,194

REMOTE CONTROL FOR MULTIPLE SPEED TRANSMISSION

Lindsay L. A. Thompson, Detroit, and Gordon R. Jewell, Plymouth, Mich., assignors to Ford Motor Company, Dearborn, Mich., a corporation of Delaware Filed May 22, 1957, Ser. No. 660,952

7 Claims. (Cl. 74—473)

Our invention relates generally to a mechanical control mechanism and more particularly to a new and improved ratio selector for automatic power transmissions with multiple speed ranges. Our invention is particularly adapted to be used with automotive type power transmission mechanisms for effecting a selection of any desired transmission driving range during operation.

The improved selector mechanism of our instant invention is characterized by a selector wheel or dial located at a convenient location within the driver compartment of an automotive vehicle whereby the vehicle operator may manually rotate the same about a fixed axis. Means are provided for translating the rotary motion of the selector wheel into an appropriate movement of a movable range selector element of the automatic controls for the power transmission, said range selector element normally forming a portion of the power transmission automatic control circuit. The selector mechanism may be suitably adjusted so that a definite angular position of the selector wheel will correspond to a given transmission driving range.

According to one principal feature of our invention, means are provided for indexing the wheel to define the various angular positions which correspond to the several driving speed ranges. This indexing function is accomplished by a gate mechanism including an indexing key fixedly carried by the wheel and by a cooperating gate opening formed in a relatively stationary part of the wheel mounting structure, said key being adapted to be received within the gate opening. These indexing parts of the mechanism are moved into and out of cooperating relationship as the selector wheel is shifted axially. The gate opening and the index key cooperate to prevent an inadvertent shift from a forward driving range to reverse or from a high speed forward driving range to a low speed driving range while the vehicle road speed is at a relatively high value. If the transmission mechanism includes a parking pawl or some other form of tail shaft locking device, the gate opening may be provided with a park position and suitable inhibitor shoulders may be formed in the gate opening to prevent an inadvertent shift into the park position when the vehicle is in motion.

The required axial shifting movement of the selector wheel is accomplished by an improved wheel mounting means whereby the wheel itself is capable of a so-called floating movement in an axial direction while at the same time rotating about its geometric axis. Spring means are provided for normally urging the selector wheel in one axial direction thereby tending to maintain the same in either a neutral or a forward, high speed driving range. To effect a shift of the selector wheel from a neutral position or from a high speed driving range to any of the other drive positions the vehicle operator must overcome the spring tension in order to override the inhibitor shoulders of the gate mechanism.

The provision of an improved transmission selector of the type above set forth being a principal object of our invention, it is a further object of our invention to provide a remote control for a multiple speed, power transmission mechanism which is simple in construction and operation and which may be readily adapted to be used in a large variety of automatic transmission mechanisms of known construction.

It is a further object of our invention to provide an improved control system for an automatic power transmission mechanism for an automotive vehicle which includes a manually operable control lever conveniently mounted on the vehicle dash structure.

It is a further object of our invention to provide a transmission control mechanism as set forth above wherein means are provided for avoiding an inadvertent shift of the manually operable control member into a low speed, forward driving range, into reverse or into a park position thereby adding to the inherent safety of the control system.

It is a further object of our invention to provide a control system of the type above described and which is capable of effecting a shift into a transmission park position thereby actuating a mechanical transmission tail shaft locking device.

It is a further object of our invention to provide a transmission control system as above set forth wherein a mechanical linkage system is employed for transmitting the motion of the manually operable control member to an appropriate control element of the transmission shift control assembly and wherein this motion transmitting means is characterized by a substantial mechanical advantage, the effective torque made available to the transmission control elements being greater than the actuating torque applied to the manually operated control member.

Further objects and features of our invention will readily become apparent from the following particular description taken in conjunction with the accompanying drawings wherein:

Figure 1 is an elevational view of a manually operable control member forming a part of the control system of our instant invention as viewed from a point located on its geometric axis;

Figure 2 is a side view of the control member of Figure 1 with parts shown in section;

Figure 3 is a complete cross sectional view of the assembly of which the manually operable control member is comprised and it is taken along section line 3—3 of Figure 1;

Figures 4 and 5 are cross sectional views taken along a plane transverse to the geometric axis of rotation of the control member of Figures 1, 2 and 3, the plane at which the section is taken being designated in Figure 3 by section lines 4—4 and 5—5 respectively;

Figure 6 is a subassembly sectional view of a portion of the assembly of Figure 3 showing a part of the detent mechanism for the assembly. Figure 6 is taken along section 6—6 of Figure 3;

Figure 7 is a partial, unwrapped sectional view of the detent mechanism shown in Figure 6 and is taken along an arcuate plane designated by sectional line 7—7 of Figure 6;

Figure 8 is a subassembly view of a portion of the assembly shown on Figure 3 and is taken along section line 8—8 of Figure 3;

Figure 9 is an enlarged view of a portion of the subassembly view of Figure 8 showing a detent roller in particular detail;

Figure 10 is an enlarged view of a portion of the subassembly of Figure 8 and is taken along section line 10—10 of Figure 8;

Figure 11 is a partial elevation view of a portion of the assembly of Figure 3 taken along section line 11—11 of Figure 8 showing the contruction of the gate mechanism; and Figure 12 is a view showing the installation of the control system of our instant invention within the vehicle passenger compartment together with means for mechanically connecting the manually operable control member with the control elements of the transmission mechanism.

Referring first to Figure 12, numeral 10 generally designates a drive range selector wheel conveniently located within the passenger compartment of a conventional passenger vehicle of recent design and it is situated adjacent the vehicle operator so that he may be enabled to rotate the same about its geometric axis to effect a shift from one transmission driving range to another as will subsequently be described. Numeral 12 designates a side extension of the vehicle dash structure and numeral 14 designates a vehicle windshield which curves around to either side of the vehicle and terminates at either "A" post. The forward portion of the vehicle dash structure and the vehicle engine cowling cooperate to form a support for the windshield 14. For purposes of clarity the vehicle side panels have been omitted from the drawing together with the portions of the vehicle body on which the wheel 10 is mounted. It is emphasized that Figure 12 is a partial illustration of the shift control mechanism as it is viewed from the left side of the vehicle. The vehicle operator would view the opposite side of the wheel 10 and the elements comprising the mechanical connection between the wheel 10 and the transmission control elements would not ordinarily be apparent from within the passenger compartment.

The selector wheel 10 is rotatably mounted on a shaft 16 which in turn is mounted within a suitable opening formed in a mounting plate 18. The plate 18 may in turn be positively secured to a structural member of the vehicle body by suitable bolts 20 and 22. A first linkage element 24 is mounted for oscillatory motion upon the mounting plate 18, the axis of oscillation of the link 24 being designated by numeral 26. The wheel 10 is formed with a radially extending lever or arm 28 which is capable of moving with the wheel about the axis of rotation of the latter during operation. The free end of the arm 28 is positively linked to the corresponding free end of the element 24 by means of a linkage element 30 thereby establishing a parallelogram type linkage system. For purposes of clarity we have generally designated by means of phantom lines in Figure 12 an alternate position for the arm 28 and the linkage elements 24 and 30. The position illustrated by means of full lines in Figure 12 represents one extreme position for the linkage system and the other position represents the other extreme position.

Another linkage element 32 is pivoted to the linkage element 24 at a point intermediate the ends thereof by means of a conventional type adjustable coupling element 34. The linkage element 32 extends within a guide housing 36 which in turn may be pivotally connected to a forward portion 38 of the vehicle dash structure by means of a suitable bracket 40. The bracket 40 accommodates a limited pivoting motion of the guide 36 about an axis 42. The linkage element 32 may be connected within the casing 36 to one end of a push-pull cable 44, the latter including a relatively stationary shroud 46 secured in place within the guide casing 36 by an appropriate insert 48.

The vehicle engine is generally designated in Figure 12 by numeral 50 and the transmission casing is bolted to the rear face 52 of the engine 50 in a conventional fashion, said transmission casing comprising two principal parts, namely, a converter bell housing portion 54 and a planetary gear housing portion 56. The floor pan of the vehicle body is designated by numeral 58.

The shift control elements of the transmission are situated below the planetary gear elements located within the planetary gear housing portion 56 and they include a control shaft 60 mounted within the housing portion 56 and extending outwardly as indicated. A control lever 62 may be positively connected to the shaft 60 to effect appropriate adjustments of the latter to condition the transmission for operation in any of the several operating ranges.

The above-mentioned cable 44 is connected to the lever 62 by means of a toggle type connection which includes toggle elements 64 and 66, the former being pivoted to the end of the lever 62 and the latter being pivotally mounted on a stationary bracket 68 which in turn is positively bolted to the transmission casing. The cable 44 extends within a suitable cable guiding element 70 which in turn may be fixed to the bracket 72 by means of bolts 74. The brackets 72 may in turn be fixed to the transmission casing by one or more bolts 76.

The guiding element 70 houses suitable connecting elements between the cable 44 and an outwardly extending eyelet member 78 and it includes a suitable means for effecting an adjustment between the cable 44 and the member 78. The common ends of the toggle elements 64 and 66 are linked to the eyelet member 78 by a link 80 thereby completing the connection between the above-described selector wheel 10 and the control lever 62.

Referring next to Figures 1, 2 and 3, the above-described selector wheel 10 is shown in more particular detail and it includes a rim 82 which may be formed of any suitable material such as a commercial resin. By preference, the axial sides of the rim 82 may be formed with circumferentially spaced recesses 84 to facilitate rotation of the wheel about its geometric axis and to provide a convenient gripping surface for the vehicle operator. A decorative type wheel shield may be inserted within the rim as indicated at 86.

The outer periphery of the rim 82 is formed with radially extending openings within which inserts 88 are positioned, each insert 88 carrying one of several different symbols, namely, "L," "D," "N," "R," or "P." The various symbols are located on the rim at appropriately spaced locations to indicate operating positions; the symbol "L" representing low speed forward drive range, the symbol "D" representing high speed driving range, the symbol "N" representing neutral, the symbol "R" representing reverse, and the symbol "P" representing the park position. The plastic material of which the rim 82 is formed may be translucent and a suitable electric lamp fixture may be provided, if desired, for illuminating the various symbols to designate the different operating drive ranges.

Annular spacers 90 and 92 are positioned within the inner periphery of the rim 82 in juxtaposed relationship as indicated and they are held in fixed relationship with respect to the rim 82 by means of a ridge 94 received within a circumferential groove formed by the spacers 90 and 92. The above-mentioned wheel shield 86 is received within the rim 82 in adjacent relationship with respect to the spacer 90.

The mounting structure for the selector wheel 10 includes the above-mentioned mounting shaft 16 which may be formed with stepped diameter portions 96 and 98. A plate like adaptor 100 having a central opening 102 is received over the reduced diameter portion 98 of the shaft 16 and it is provided with a flanged peripheral edge 104. As best seen in Figure 4, the adaptor 100 has a shape similar to that of a five-sided polygon. A second adaptor 106 is situated in adjacent side by side relationship with respect to the adaptor 100 and is formed with a central opening 108 to permit the same to be received over reduced diameter shaft portion 98. The adaptor 106 is also formed with a flanged peripheral edge and it is shaped somewhat similar to adaptor 100 as best seen in Figure 5.

The previously described radially extending arm 28 of the adaptor 106 has mounted at the free end thereof of a socket member 112 of a ball and socket cable connection subsequently to be described. The member 112 may be fixed in place by a suitable locking washer 114.

As best observed in Figure 5, the adaptor 106 is formed with a channel-like groove 116 extending transversely thereacross in spaced relationship with respect to the central opening 108. The channel 116 is adapted to receive the intermediate portion of a bent rod 118 having laterally displaced end sections 120 and 122 which in turn may be received through diametrically opposed openings formed in an annular flange 124 of the spacer 92. Similarly, the adaptor 100 may be formed with a groove running substantially perpendicular to the aforementioned groove 116; and as best seen in Figure 4, another bent rod 126 is received within this groove. The rod 126 is formed with laterally spaced end portions 128 and 130 as indicated and they are adapted to be received within diametrically opposed openings formed in an annular flange 132 of the spacer 90. The spacers 90 and 92 are held in assembled relationship by suitable rivets 134 and the adaptors 100 and 106 may be fixed together in any suitable fashion; for example, by means of spot welding. The adaptors 100 and 106 may be held in place on the reduced diameter shaft section 198 by a snap ring 136. It is thus apparent that the selector wheel 10 will be maintained in fixed relationship with respect to the axis of the shaft 16 by means of the supporting rods 118 and 126. However, the selector wheel 10 is capable of movement in the direction of the axis of shaft 16 by reason of the pivotal connection between the ends of the rods 118 and 126 with respect to the spacers 92 and 90, respectively.

As best seen in Figures 3 and 4, a spring retainer member 138 is secured to one side of the adaptor 100 in concentric relationship with respect to shaft 16 and it is generally cup-shaped with a radially extending flange 140 about the periphery thereof. The base of the retainer member 138 may be riveted or otherwise permanently secured to the adaptor 100 as indicated in Figure 4 by numeral 142.

As best seen in Figure 4, the flange 140 extends in a radial direction at two diametrically opposed locations to form spring supporting tabs 144 and 146. A leaf type spring 148 having a generally circular outline and a somewhat elliptical central opening may be secured to the tabs 144 and 146 and held securely in place thereby. The free sides of the spring 148 may be formed with diametrically opposed projections 150 and 152 which may be received through cooperating openings formed in the flange 132 of the spacer 90, said projections 150 and 152 being situated approximately 90° from the extensions 144 and 146. As best illustrated in Figure 3, the spring 148 is flexed with the tabs 150 and 152 displaced axially in a left-hand direction, as viewed in Figure 3, with respect to the flange 140 of the spring retainer member 138.

A gate member is designated in Figures 3 and 11 by numeral 154 and it is substantially drum shaped with an outer cylindrical section 156 and an end section 158. The end section may be permanently secured to a bearing sleeve 160 journaled on the shaft 16. The gate member 154 may be apertured as shown to form axially displaced tabs 162 and 164 and these in turn may be riveted or otherwise positively secured to an annular spring disc 166, said spring disc being best seen in Figure 8. The disc 166 is thus held in fixed transverse relationship with respect to the axis of shaft 16. A pair of detent wheels 168 and 170 are mounted at diametrically opposed locations on the spring discs 166 with the axis of the wheels running radially with respect to the axis of the shaft 16. The spring disc 166 is formed with a pair of diametrically spaced openings within which the wheels 168 and 170 are located, said wheels 168 and 170 being rotatably mounted on axle shafts 172 and 174 respectively. The spring disc 166 is formed with radial recesses for receiving the axle shafts 172 and 174 as illustrated and a clip is inserted through the disc 166 in overlapping relationship with respect to the axle shafts. As best seen in Figures 9 and 10, the clip associated with the detent wheel 170 is designated by the numeral 176 and it is adapted to maintain the axle shaft 174 within the associated groove formed in the spring disc 166. The opening in the spring disc for accommodating detent wheel 170 is oblong in shape as indicated at 178.

A detent member is designated in Figure 3 by numeral 180 and it is substantially cup-shaped with the base thereof permanently secured to the adaptor 106. It is thus apparent that the detent member 180, the adaptors 106 and 100, and the spring retainer member 138 form a unitary subassembly capable of rotating with the selector wheel 10 about the axis of the shaft 16. The detent member 180 is formed with a peripheral flange 182 extending in a radial direction, said flange being formed with a plurality of detent recesses as best seen in Figures 6 and 7. The detent wheels 170 are adapted to engage the detent recesses formed in the flange 186 of the detent member 180. For purposes of clarity, the detent recesses have been illustrated in Figure 7 by means of an unwrapped view, each detent corresponding to one of the operating drive ranges for the transmission. It will be apparent that the detent wheels 170 will pass from one recess to the other as the detent wheel 10 is rotated about its axis. In passing from one recess to the other the spring disc 166 will flex to permit a shifting movement of the detent wheels. The position the detent wheels occupy when they are in engagement with one of the detent recesses is illustrated in Figure 10 by phantom lines.

The outer cylindrical surface 156 of the gate member 154 is formed with a gate opening shown in Figures 3 and 11 at 184 which is comprised of an intermediate section 186 and end sections 188 and 190. As best seen in Figures 3, 8 and 11 an index key 192 is received within the gate opening 184. The key 192 includes an axially extending portion which may be positively secured to the annular flange 124 formed on the spacer 92, the connection therebetween comprising spot welded joints as best seen in Figure 5 at 194 and 196.

The spring 148 urges the selector wheel 10 in a right-hand direction, as viewed in Figure 3, and this causes the key 192 to ride against the right-hand edge of the gate opening 184. When the key 192 is in the position shown in Figure 11, the selector wheel is in the neutral position and when the key 192 is in the upper extreme position of the intermediate section 186, the selector wheel 10 is in the high speed, forward drive range.

In order to shift the selector wheel 10 into a low speed forward drive range, it is necessary to urge the wheel in a leftward direction against the opposing force of spring 148 until the key 192 contacts the left-hand edge of the gate opening 184. The vehicle operator may then rotate the wheel until the key 192 becomes positioned in the upper section 188 of the gate opening 184.

In order to shift the selector wheel into the reverse drive position, the key 192 is maintained in contact with the left-hand edge of the gate opening 184 and the wheel is rotated until the key contacts shoulder 198 of the gate opening. If it is desired to shift the selector wheel 10 into a park position, the wheel is first shifted in a leftward direction to cause the key 192 to contact the left edge of the gate opening 184 and the wheel is then first shifted to the reverse drive position above-described. The selector wheel may then be caused to shift under spring tension until the key 192 aligns itself with the lower gate section 190. The selector wheel may then be rotated until the key 192 is positioned in the lowermost end of the section 190. The required axial floating movement of the selector wheel is obtained by reason of the offset mounting rods 118 and 126.

It is apparent from the foregoing description that rotary movement of the selector wheel 10 will be translated to a reciprocating movement of the cable 44 by reason of the shift control linkage previously described. The torque transmitted to the arm 28 is multiplied by the linkage elements 24, 34 and 30 and the control lever operating force is greatly magnified by reason of the connection formed by elements 64 and 66 at the lower end of the cable 44.

Having thus described the principal features of the improved control system of our instant invention, what we claim and desire to secure by U.S. Letters Patent is:

1. In a remote control for a multiple speed, power transmission mechanism comprising a manually operable selector wheel, means for mounting said wheel for rotation about its geometric axis, said transmission mechanism including a manually operable range selector control element, means for accommodating a limited shifting movement of said wheel in the direction of its geometric axis from one plane of rotation to another, a gate mechanism including a first portion connected to said wheel and a second portion cooperating with said first portion to inhibit rotary movement of said wheel outside certain limiting angular positions during rotation thereof in said one plane of rotation and for inhibiting rotation of said wheel outside certain other limiting positions durng rotation thereof in said other plane of rotation, and motion transmitting means interconnecting said wheel and said control element for translating the rotary motion of said wheel into movement of said control element.

2. In a remote control for a multiple speed, power transmission mechanism comprising a manually operable selector wheel, a mounting shaft for said wheel, a wheel hub assembly including a support member rotatably journaled on said shaft, a pair of transversely disposed rods, the intermediate portion of each rod being pivotally mounted on said support member, each of said rods having end portions offset from the intermediate portion thereof, and a wheel rim, the end portion of each of said rods being journaled in said rim at substantially diametrically spaced locations thereon, said rim thereby being adapted for movement about the axis of said shaft and for movement in the direction of the axis of said shaft.

3. In a remote control for a multiple speed, power transmission mechanism comprising a manually operable selector wheel, a mounting shaft for said wheel, a wheel hub assembly including a support member rotatably journaled on said shaft, a pair of transversely disposed rods, the intermediate portion of said rods being pivotally mounted on said support member, each of said rods having end portions offset from the intermediate portion thereof, a wheel rim, the end portion of each of said rods being journaled in said rim at substantially diametrically spaced locations thereon, said rim thereby being adapted for movement about the axis of said shaft and for movement in the direction of the axis of said shaft, and a detent mechanism including a relatively movable and interengageable detent portions, one detent portion being fixed in a stationary position by said shaft and the other detent portion being carried by said support member, said detent mechanism being effective to establish a plurality of angularly spaced operating positions for said wheel.

4. In a remote control for a multiple speed, power transmission mechanism comprising a manually operable selector wheel, a mounting shaft for said wheel, a wheel hub assembly including a support member rotatably journaled on said shaft, a pair of transversely disposed rods, the intermediate portion of said rods being pivotally mounted on said support member, each of said rods having end portions offset from the intermed'ate portion thereof, a wheel rim, the end portion of each of said rods being journaled in said rim at substantially diametrically spaced locations thereon, said rim thereby being adapted for movement about the axis of said shaft and for movement in the direction of the axis of said shaft, a gate mechanism including a gate element fixedly supported by said shaft and having an elongated gate opening with a pair of axially spaced edges, at least one of said edges being discontinuous, the points of discontinuity of said edge each being characterized by an abutment shoulder, an index element carried by said rim with an end portion thereof extending through said gate opening, and spring means for continuously biasing said rim in one axial direction thereby causing said index member to normally engage one of the edges of said gate opening.

5. In a remote control for a multiple speed, power transmission mechanism for an automotive vehicle, said vehicle including a passenger compartment with a forwardly situated dash structure and sa d power transmission mechanism including a movable operating range selector control element; a manually operable selector wheel, a shaft mounted on said dash structure, a wheel hub assembly including a support member rotatably journaled on said shaft, a pair of transversely disposed rods, an intermediate portion of said rods being mounted on said support member, each of said rods having end portions offset from the intermediate portion thereof, a wheel rim, the end portions of each of said rods being journaled in said rim at substantially diametrically spaced locations thereon, said rim thereby being adapted for compound movement about the axis of said shaft and in the direction of the axis of said shaft, an operating lever carried by said hub assembly, a mechanical linkage operatively connecting said operating lever with said range selector control element, said mechanical linkage including means for multiplying the mechanical advantage of said selector wheel with respect to said range selector control element, and gate means for regulating the rotary motion of said selector wheel whereby the range of angular positions of said wheel during movement thereof in one plane of rotation is different than the range of angular positions of said wheel when the latter is operating in an axially displaced plane of rotation.

6. The combination as set forth in claim 5 wherein said wheel hub assembly includes a detent mechanism having relatively movable and interengageable detent portions, one detent portion being fixed in a stationary position by said shaft and the other detent portion being carried by said support member.

7. A remote control mechanism for actuating a control member for a multiple speed, power transmission comprising a manually operable selector wheel including a wheel hub assembly, means for rotatably journaling said hub assembly, a pair of rods extending outwardly relative to the axis of said wheel, the radially inward portion of said rods being pivotally mounted on said hub assembly, each of said rods having an outwardly disposed end portion offset from the radially inward portion thereof, a wheel rim, the radially outward end portion of each of said rods being journaled in sa'd rim at angularly spaced locations, said rim thereby being adapted for rotary movement about the axis of said wheel and for translatory movement in the direction of the axis of sa'd wheel, means for connecting said wheel to sa'd control member, and gate means for limiting rotation of said wheel within a predetermined range of operating limits when said wheel is rotated in one plane and for limiting rotation of said wheel within another range of operating limits when said wheel is rotated in another plane.

References Cited in the file of this patent

UNITED STATES PATENTS

| 2,029,485 | Kesling | Feb. 4, 1936 |
| 2,839,945 | Zion | June 24, 1958 |

FOREIGN PATENTS

| 636,725 | Germany | Oct. 14, 1936 |
| 644,841 | Germany | May 14, 1937 |
| 753,239 | France | Oct. 11, 1933 |
| 949,384 | France | Aug. 29, 1949 |